March 30, 1926.　　　　　　　　　　　　　　　1,578,479
H. A. STEWART ET AL
TRACTOR
Filed April 1, 1925　　　3 Sheets-Sheet 1
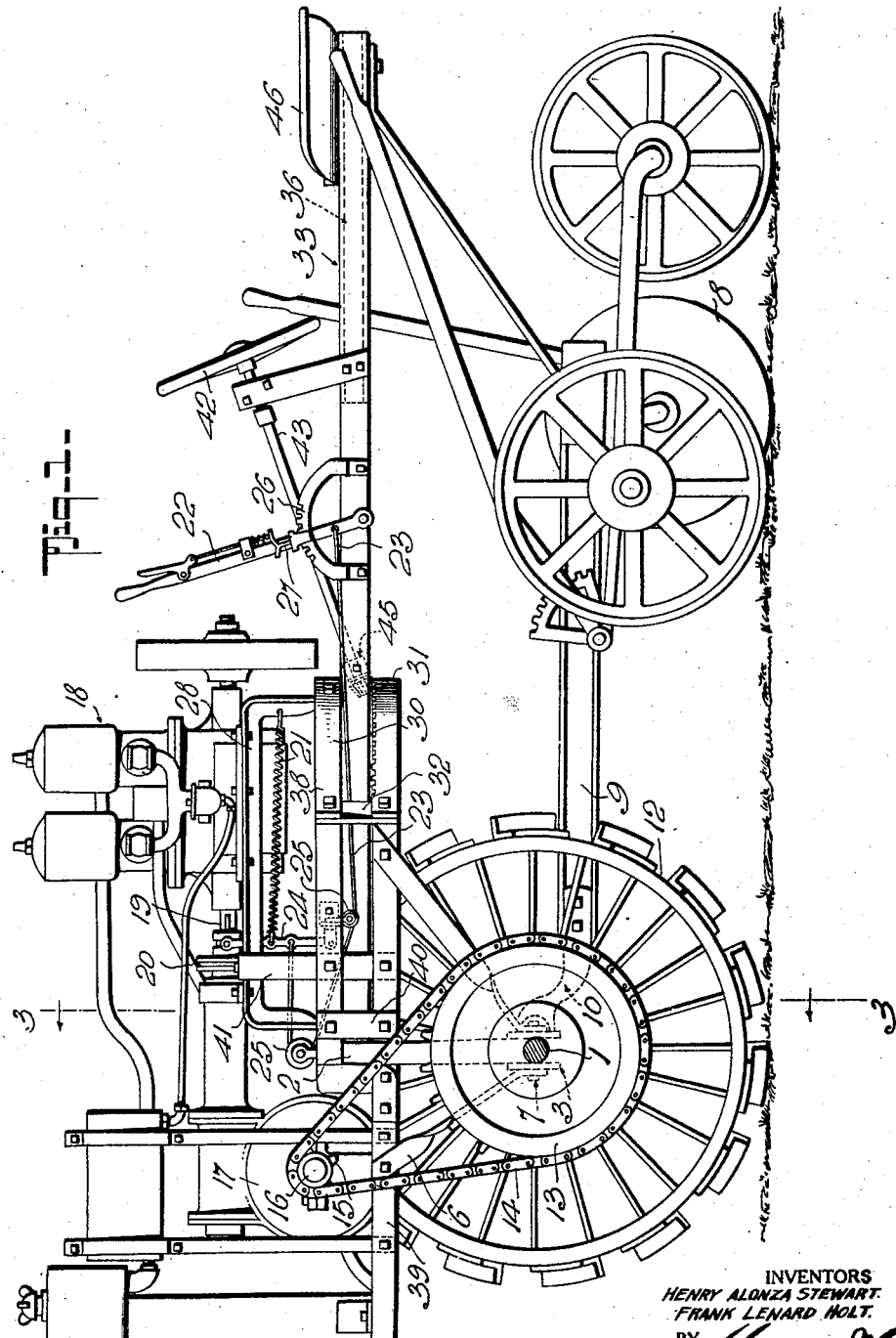
INVENTORS
HENRY ALONZA STEWART.
FRANK LENARD HOLT.
BY
ATTORNEYS

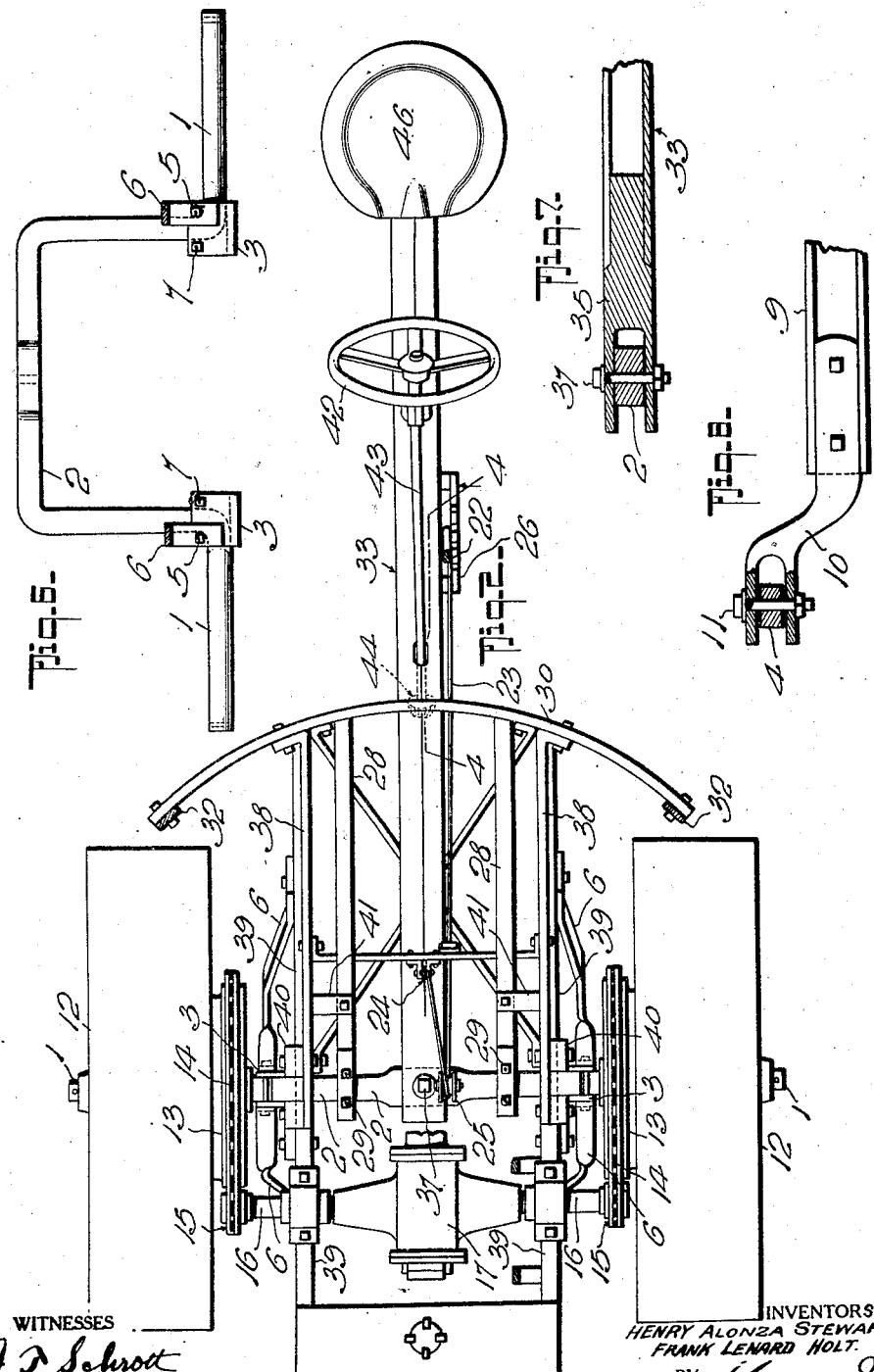

March 30, 1926.
H. A. STEWART ET AL
1,578,479
TRACTOR
Filed April 1, 1925
3 Sheets-Sheet 3
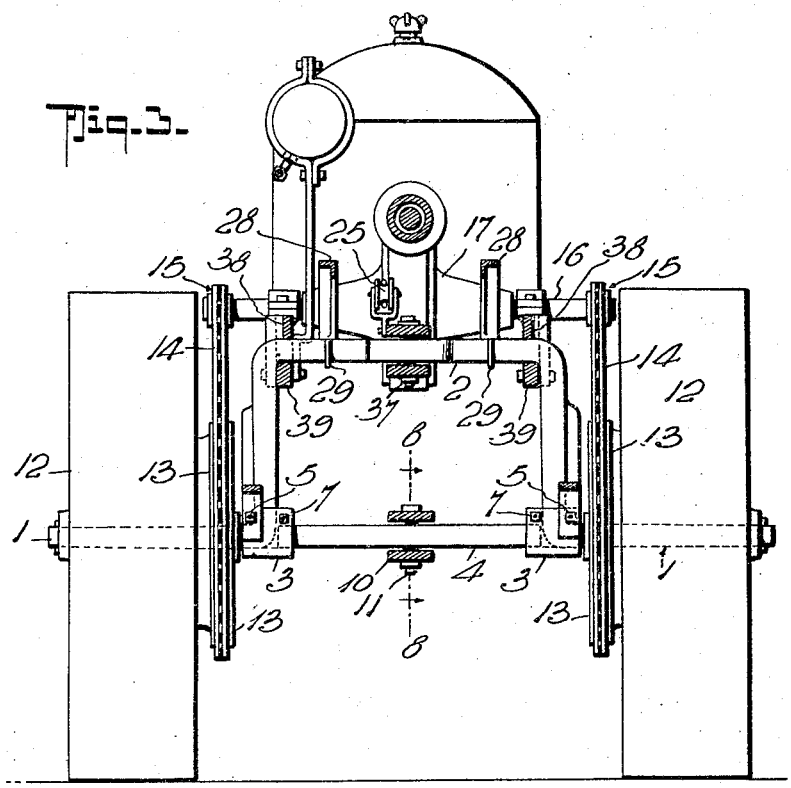
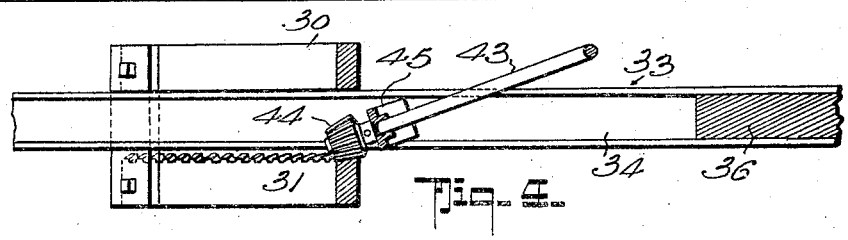
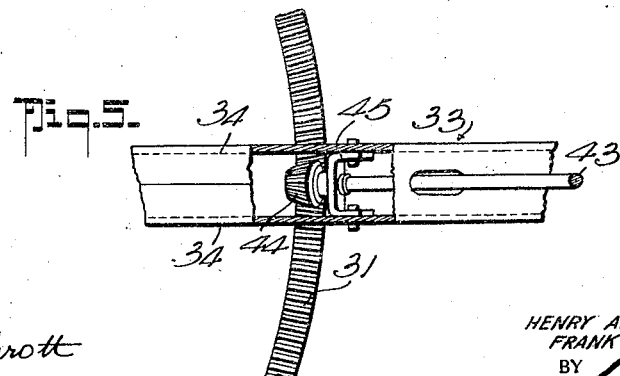
WITNESSES
INVENTORS
HENRY ALONZA STEWART
FRANK LENARD HOLT
BY
ATTORNEYS Patented Mar. 30, 1926.

1,578,479

UNITED STATES PATENT OFFICE.

HENRY ALONZA STEWART AND FRANK LENARD HOLT, OF TULLAHOMA, TENNESSEE.

TRACTOR.

Application filed April 1, 1925. Serial No. 19,978.

*To all whom it may concern:*

Be it known that we, HENRY ALONZA STEWART and FRANK LENARD HOLT, citizens of the United States, and residents of Tullahoma, in the county of Coffee and State of Tennessee, have invented certain new and useful Improvements in Tractors, of which the following is a specification.

This invention relates to improvements in farm tractors, and it consists of the constructions, combinations and arrangements herein described and claimed.

An object of the invention is to provide a tractor, intended particularly for use on farms, having a novel arrangement of an arch axle and draw bar by means of which either cultivating or plowing implements may be drawn, a novel disposition of the engine which tends to prevent the tractor from turning over, and also a novel arrangement of yoke or framework itself.

Other objects and advantages appear in the following specification, reference being had to the accompanying drawings, in which—

Figure 1 is a side elevation of the improved tractor.

Figure 2 is a plan view thereof.

Figure 3 is a cross section taken substantially on the line 3—3 of Figure 1.

Figure 4 is a detail longitudinal section of the upper coupling bar taken substantially on the line 4—4 of Figure 2.

Figure 5 is a detail plan view of the coupling bar, parts being shown in section, particularly illustrating the cuff which supports the steering shaft.

Figure 6 is a detail elevation of the arch axle, the removable draw bar being omitted.

Figure 7 is a detail sectional view of the inner end of the upper coupling bar.

Figure 8 is a detail sectional view of the implement hitch.

In carrying out the invention provision is made of a one-piece axle 1 which is bent in the shape of an inverted U in the middle to provide an arch 2. If the tractor is used for comparatively light work such as cultivating growing plants, the implements are hitched onto the arch 2 by suitable means (not shown), the arch axle being sufficiently high to ride over plants of considerable height without injury thereto.

Coupling plates 3 provide mounts for a draw bar 4, which when in place, provides a substantial continuation of the axle 1. The draw bar is separable from the tractor, but is intended to be used for heavy work, such as plowing. The coupling plates are situated at a corner between the axle and upright legs of the arch. They are permanently held in place by bolts 5 which also secure braces 6. Upon removal of bolts 7 the draw bar 4 may be taken out.

Figure 1 illustrates an implement 8 in place. The beam 9 has a hitch 10 (Fig. 8) secured to the draw bar 4 by means of a bolt 11. The removal of the bolt permits disconnection of the implement. Wheels 12 revolve upon the axles 1. Each of these wheels carries a large sprocket 13 driven by a chain 14 from a small sprocket 15.

The sprockets 15 are fixed on the extremities of a differential shaft 16 which is driven by suitable gearing in the differential case 17. The gearing will be similar to that found in the differential case of an automobile, and makes provision for the turning of the tractor.

A two-cylinder two-cycle motor 18 has a drive shaft 19 by which the differential gearing is driven. The driving power is controlled by a disk clutch 20 which is normally held inoperative by a spring 21. Upon pulling rearwardly on the lever 22 the clutch is rendered operative to transmit power to the case 17 and thus to the wheels of the tractor.

A chain or cable 23 connects the lever 22 with an arm 24 which does the necessary shifting of the clutch 20. The chain passes over suitable guide rollers 25 before it is attached to the arm. One end of the spring 21 is also attached to the arm. The quadrant 26 and detent 27 hold the adjustments of the lever 22.

The motor 18 is mounted upon the tractor frame well in back of the axle. This balances the frame and tends to prevent the turning over of the tractor upon the axle 1. The tractor frame comprises a pair of upper yokes 28 upon which the motor 18 is suitably mounted. The forward ends of these yokes are attached to the arched axle 2 by means of clips 29. The rear ends are attached to a lower yoke 30. The lower yoke is a two-part member, including a quadrant 31.

Bars 32 connect the extremities of the members 30 and 31 which are arcuate in form and are of the same shape when viewed in plan (Fig. 2). They are situated on opposite sides of the coupling bar 33. This bar is composed of a pair of confronting panels 34 (Figs. 4 and 5) which carry an upper coupling 35 (Fig. 7) at the forward end and a piece of timber 36 at the rearward end. The coupling 35 is attached to the arch 2 by a king bolt 37.

An arrangement of suitably bent bars 38 and 39 completes the major part of the framework. It is to the latter that the braces 6 run. Short pieces 40 connect the frame members 38 and 39 adjacent to the arch axle 2, and braces 41 secured to these frame members, assist in supporting the upper yokes 28 and consequently the motor.

Steering of the tractor is done by a wheel 42 on a shaft 43 which carries a pinion 44 meshing with the quadrant 31. The steering shaft is supported in suitable bearings, the lower one of these having a cuff member 45 suitably incorporated in the coupling bar 33. A turn of the hand wheel 42 in either direction brings the entire tractor frame and its carried parts either to the right or left of the coupling bar 33, the king bolt 37 constituting the pivot. The arcuate yoke 30 serves as a guide for the frame during this movement. The coupling bar has a seat 46 to be occupied by the operator. All of the various controlling devices (the hand wheel, levers, etc.) are accessible from this position.

A number of advantages might be observed in the improved construction. It is noticeable that the construction is extremely simple, thereby to a large extent eliminating the difficulty in manufacture. The disposition of the motor on the framework maintains the equilibrium of the tractor upon its wheels, preventing tilting particularly forward.

The novel arrangement of the curved rack 31 and pinion 44 permits the making of quick and short turns. Practically all of the mechanism is situated above the frame, leaving the space underneath entirely free for such earth working implements as may be used. The novel arrangement of the clutch control permits the operation regardless of the position of the turnable frame 30, 31, etc., in relationship to the coupling bar 33 because the turning point at the king bolt 25 occupies almost the same position as the guide pulley 25.

While the construction of the improved tractor is that of a generally preferred form, obviously modifications and changes may be made without departing from the spirit of the invention or the scope of the claims.

We claim:

1. A tractor comprising an axle having an arch, wheels on the ends of the axle, a framework applied to the arch, a coupling bar, means including a king bolt by which said bar is pivotally attached to the arch for horizontal turning of the framework, and a yoke included in said framework having members situated both above and below said coupling bar permitting said horizontal turning but tending to prevent the tractor from tilting over forwardly.

2. A tractor comprising an axle having an arch, a coupling bar, means by which the coupling bar is pivotally connected to the arch, framework applied to the arch axle including a yoke which has members disposed respectively above and below the coupling bar, said lower member having teeth thus constituting a rack, and securing means carried by the coupling bar including a shaft having a pinion meshing with the rack causing bodily turning of the framework upon said pivot in reference to the coupling bar.

3. A tractor comprising an axle, wheels mounted on the ends of the axle, a coupling bar pivotally attached to the axle and extending rearwardly, framework applied to the axle and including a yoke having members situated respectively on the upper and lower sides of the coupling bar thereby stabilizing the tractor and holding the framework down to the coupling bar, an upper yoke attached to the framework and to the aforesaid upper member thereof, and a motor mounted upon said upper yoke being situated in proximity to said upper and lower members and in a position to the rear of the axle thereby assisting in preventing the tilting over of the tractor in the forward direction.

4. A tractor comprising a wheeled axle, a framework secured on top of the axle, a yoke included in the framework consisting of a pair of arcuate members, the confronting edge of one of said members being toothed to constitute a rack, bars securing the ends of the arcuate members in parallel spaced relationship, a coupling bar extending through the space between said members, means including a king bolt by which the coupling bar is pivotally attached to the axle, said king bolt constituting the center of said arcuate members, a steering shaft having a hand wheel, bearing means including a cuff supporting the shaft, and a pinion mounted on the shaft engaging the teeth of said rack providing for the bodily turning of the framework and its associated parts upon the king bolt in reference to the coupling bar.

HENRY ALONZA STEWART.
FRANK LENARD HOLT.